United States Patent [19]

Henze et al.

[11] 4,215,505
[45] Aug. 5, 1980

[54] CABLE HARDWARE

[75] Inventors: Walter J. Henze, North Wildwood, N.J.; William Purcell, Philadelphia, Pa.

[73] Assignee: Penn Fishing Tackle Mfg. Co., Philadelphia, Pa.

[21] Appl. No.: 36,366

[22] Filed: May 7, 1979

[51] Int. Cl.³ .............................................. A01K 91/06
[52] U.S. Cl. ...................................... 43/27.4; 43/43.1; 43/44.9
[58] Field of Search .................. 43/24, 42.72, 43.1, 43/44.9, 27.4, 42.36, 42.49, 44.92, 44.91; 242/107.2; 254/190 R, 197

[56] References Cited

U.S. PATENT DOCUMENTS

| 171,890 | 1/1876 | Wagner | 43/43.1 X |
| 1,333,318 | 3/1920 | Kijima | 43/42.36 X |
| 3,507,070 | 4/1970 | Rossello | 43/42.36 X |
| 3,947,990 | 4/1976 | Johnson | 43/44.9 |
| 3,961,438 | 6/1976 | Henze et al. | 43/43.12 X |
| 3,967,405 | 7/1976 | Henze et al. | 43/27.4 |
| 4,167,829 | 9/1979 | Henze et al. | 43/24 X |

Primary Examiner—Nicholas P. Godici
Assistant Examiner—Robert P. Olszewski
Attorney, Agent, or Firm—Zachary T. Wobensmith, 2nd; Zachary T. Wobensmith, III

[57] ABSTRACT

Cable hardware is disclosed for use with trolling apparatus for fishing carried by a boat, which cable hardware is carried on the line from a boom which extends from the apparatus and includes a line guide sleeve stop through which the line passes and which is prevented from passing through a bushing by the sleeve stop. The bushing is mounted in a bracket carried by the boom and the line preferably extends to a reel carried by the apparatus. Strain placed on the sleeve by winding of the line on the reel, does not place any undue strain on the hardware and transmits the strain evenly to the bushing. The line carried by the sleeve stop is prevented from kinking at the bushing and subsequent entanglement or breakage.

4 Claims, 2 Drawing Figures

CABLE HARDWARE

BACKGROUND OF THE INVENTION

1. Field of the Invention

This invention relates to cable hardware for trolling apparatus for fishing for carrying and guiding the line from the trolling apparatus without kinking or damage due to straining of the line.

2. Description of the Prior Art

The use of trolling apparatus for the taking of various species of fish has greatly increased. Such apparatus is particularly useful for delivery of bait to a zone having a water temperature where the fish sought are likely to be feeding.

The trolling apparatus is characteristically mounted on the stern portion of a boat and is likely to receive rough treatment. In order to change bait, the line must be wound and the end of the line pulled aboard the boat. The line is usually wound up in a hurry and the hardware on the line often strikes the bushing carried by the swivel bracket destroying the cable hardware, or causing the line to kink and break then or later on with jamming of the hardware in the bushing.

One example of trolling apparatus which has a swivel bracket is disclosed in our prior application Ser. No. 784,685 filed Apr. 5, 1977, now U.S. Pat. No. 4,167,829.

Another example of trolling apparatus is disclosed in our prior U.S. Pat. No. 3,961,438, wherein the tip cannot swivel of its own accord. Damage to the line can occur when it is wound on the reel due to the hardware being unprotected.

In our prior U.S. Pat. No. 3,967,405, trolling apparatus is disclosed wherein the tip can swivel independently of the boom, however, the hardware and the line carried by this structure suffers from many of the same problems as the structure shown in U.S. Pat. No. 3,961,438.

SUMMARY OF THE INVENTION

Cable hardware for use with a trolling apparatus for fishing is provided which is carried on the line which extends from the boom of the trolling apparatus, which apparatus can include a frame detachably mounted to a mounting bracket fastened to the deck or transom of a boat, which frame rotatably carries a large reel. The line passes through a guide carried on the boom over a pulley carried on a sleeve support attached to the boom which is carried by and rotatable with respect to the boom and through a bracket on the sleeve support which bracket includes a bushing that acts with a line guide sleeve stop carried on the line to prevent line kinking or entanglement with the bushing carried in the bracket and damage to the line or hardware.

The principal object of the invention is to provide cable hardware for trolling apparatus for fishing which reduces line kinking, breakage, entanglement and subsequent damage.

A further object of the invention is to provide cable hardware for trolling apparatus for fishing which provides increased operating life of the line at the free end of the boom.

A further object of the invention is to provide cable hardware for trolling apparatus for fishing which uses a line guide sleeve stop for the line at the end of the boom to act with a bushing carried by a bracket for the line to prevent line damage which is simple and inexpensive to construct.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figures 1, 2:
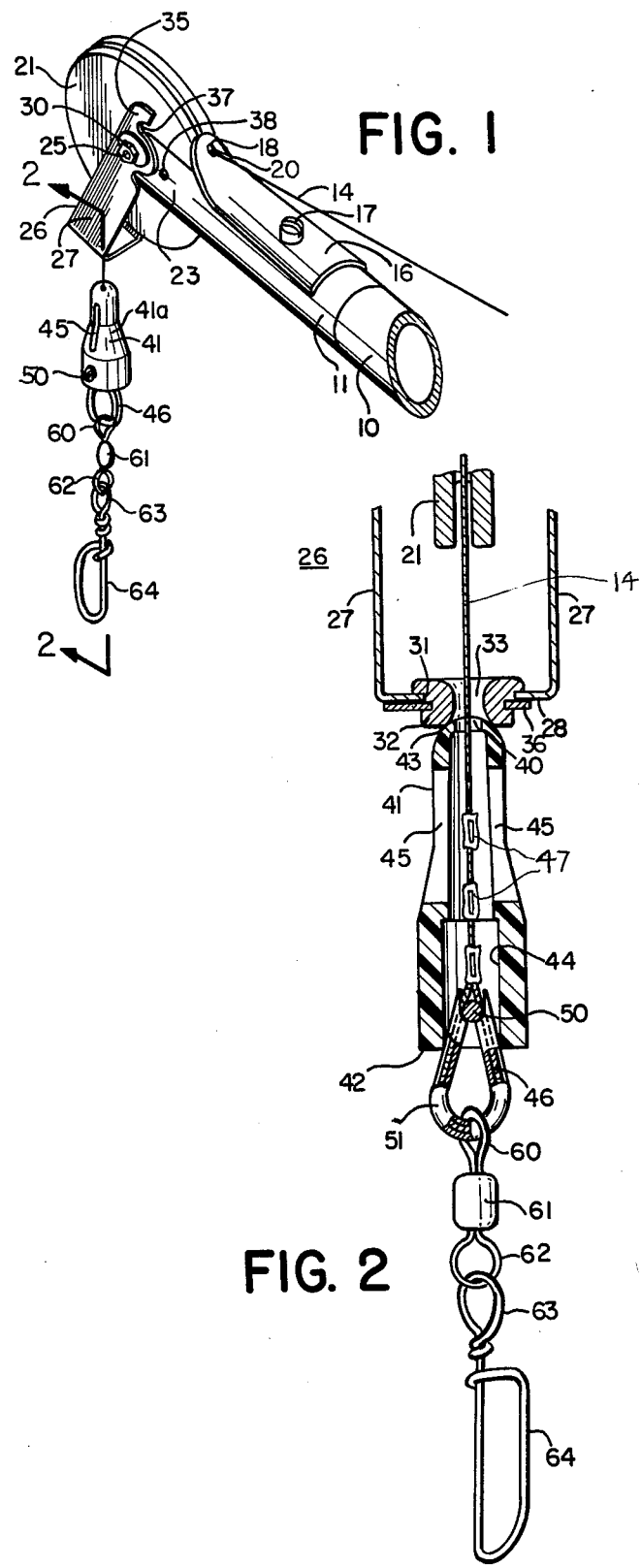
FIG. 1 is a view in perspective of the cable hardware of the invention attached to the line from a trolling apparatus.
FIG. 2 is a vertical sectional view, enlarged, taken approximately on the line 2—2 of FIG. 1.

It should of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, cable hardware for use with trolling apparatus for fishing is illustrated which includes a boom 10 which extends from a supporting frame (not shown) of trolling apparatus. The present invention is suited for use with trolling apparatus as shown more fully in U.S. Pat. No. 3,961,438, but is not limited to use with that structure.

The boom 10 is preferably formed of hollow aluminum tubing treated for corrosion resistance and secured in place in the frame assembly (not shown).

The free end of the boom 10 has a sleeve 11 thereon which is freely rotatable on the end of the boom 10 and can be mounted as shown in U.S. Pat. No. 3,967,405. Line 14 of well known type is provided which extends to a reel (not shown) and is carried in a guide bracket 16 mounted to the sleeve 11 by a stud 17. The guide bracket 16 has a central opening 18 to receive and guide the line 14 and an open slot 20 which permits of the line 14 being inserted within or removed from the guide bracket 16 as desired, but which retains the line on a pulley 21 when it is swiveled during operation. The sleeve 11 has spaced legs 23 extending therefrom between which the pulley 21 is carried and rotatably mounted on a bolt 25 which is engaged with the legs 23. The bolt 25 also supports a U-shaped bracket 26 which has side plates 27 and a connecting plate 28 and is retained thereto by a nut 30.

The plate 28 is provided with an opening 31 which carries a bushing 32, preferably of stainless steel, which is provided with a multi-tapered hole 33 for passage of the line 14 from the reel (not shown) and may be retained in the opening 31 by a clip 36.

The plates 27 can have hook like projections 35 extending therefrom and notches 37 in the plates 27 spaced approximately 180° from the projections 35 which engage screws 38 in the legs 23, the screws 38 serving as stops to restrict the movement of the bracket 26. It should be noted that the notches 37 in the plates 27 permit the bracket 26 to be swung up along boom 10 such that line 14 from bushing 32 is substantially parallel to boom 10.

The line 14 from the bushing 32 extends through a hole 40 in a hollow sleeve 41 open at the end 42 opposite to hole 40, which sleeve is of generally cylindrical configuration with a rounded end 43 adjacent hole 40 and bushing 32. The sleeve 41 is preferably formed of a molded plastic such as nylon which is resistant to corrosion and to water. The sleeve 41 is provided with slots 45 in side wall portion 41a for the passage of water to clean out any debris that finds its way inside sleeve 41 along the line 14.

The line 14 from hole 40 extends through a passageway 44 in sleeve 41 in a loop 46 configuration and doubles back where it is attached to the line 14 by retainers 47 of well known type which can be crimped onto line 14.

The crimped portion of line 14 is prevented from moving forward out of end 42 by a pin or bolt 50 which extends transversely across sleeve 41 in the loop 46. Loop 46 is tapered with the tapered portion extending into passageway 44 and can be covered with a resilient plastic sleeve 51.

The loop 46 has a loop 60 engaged therewith connected to a weight 61 with a loop 62 from weight 61 engaged with a loop 63 from a connector 64 which is connected to a hook (not shown) and quick release mechanism (not shown).

The mode of operation will now be pointed out.

Assuming that a supply of line 14 is wound onto the reel (not shown) and suitable attachments are provided on the connector 64 and that trolling is desired, a weight (not shown) is fastened to the connector 64 and a fishing line (not shown) with hook (not shown) and quick release mechanism (not shown) is connected to connector 64 is a well known manner. The depth to which it is desired to troll is determined and the reel (not shown) is rotated so that line 14 is paid out to the desired depth.

When a fish strikes or when it is desired to raise the line 14 then the reel (not shown) may be rotated and line 14 wound onto the reel (not shown).

If the line 14 is wound so that sleeve stop 41 contacts bushing 32 at the rounded end 43, the tapered loop 46 contacts passageway 44 and the strain on line 14 is distributed in sleeve 41 to bushing 32. The bolt 50 in sleeve 41 prevents the loop 46 and line 14 from moving out of sleeve 41 and kinking or becoming entangled.

The sleeve stop 41 prevents strain being placed on line 14 by movement of the line at an angle to bushing 32 so that the line 14 is not liable to be kinked.

It will thus be seen that structure has been provided with which the objects of the invention are attained.

We claim:

1. In cable hardware for use with trolling apparatus for fishing, an apparatus to prevent kinking of the line which extends through an opening in a bushing comprising a hollow sleeve carried by the line and having one end thereof of larger cross section than the opening in said bushing, said sleeve having an opening therethrough from which the line extends at one end, a connector within said opening at the other end of said sleeve to which said line is connected, said connector including a loop of larger size than said opening for attachment of tackle, and a pin mounted transversely at said other end of said sleeve, for engagement through said loop for preventing disengagement of said loop from said sleeve.

2. The apparatus defined in claim 1 in which said one end of said hollow sleeve is rounded.

3. The apparatus defined in claim 1 in which said sleeve has side wall openings in side wall portions thereof for flushing said opening.

4. The apparatus defined in claim 1 in which said sleeve is made of synthetic plastic material.

* * * * *